United States Patent [19]

Chandler

[11] Patent Number: 4,610,105
[45] Date of Patent: Sep. 9, 1986

[54] RODENT TRAP

[76] Inventor: Richard G. Chandler, 93 Bert Brown Rd., Conroe, Tex. 77302

[21] Appl. No.: 730,179

[22] Filed: May 3, 1985

[51] Int. Cl.⁴ ............................................. A01M 23/04
[52] U.S. Cl. ......................................................... 43/69
[58] Field of Search ........................................ 43/69, 74

[56] References Cited

U.S. PATENT DOCUMENTS

| | | | |
|---|---|---|---|
| 290,580 | 12/1883 | Harwell | 43/69 |
| 881,401 | 3/1908 | Herndon | 43/69 |
| 887,843 | 5/1908 | Pierce | 43/69 |
| 968,273 | 8/1910 | Shaeffer | 43/69 |
| 1,072,675 | 9/1913 | Trull | 43/69 |
| 1,259,074 | 3/1918 | Bealle | 43/69 |
| 2,092,357 | 9/1937 | Reynolds | 43/69 |
| 2,775,844 | 1/1957 | Farrell | 43/69 |

Primary Examiner—Gene P. Crosby
Attorney, Agent, or Firm—Gunn, Lee & Jackson

[57] ABSTRACT

A trap for catching rodents and other pests in permitting the user to selectively trap the same alive or dispose of them at the time of trapping. A container is provided having bottom and side walls and defining an opening at the upper portion thereof. A closure number is pivotally supported by a wall portions of the enclosure and is pivotal, responsive to the weight of a rodent or pest, causing the same to fall into the enclosure. The enclosure may contain water or any other material suitable for eratication. The closure structure defines a bait containing depression in which a protein containing bait such as grain may be placed to lure rodents onto the closure. The closure is urged to its substantially horizontal, closed position by a counterweight or other urging device mounted on the closure.

8 Claims, 5 Drawing Figures

U.S. Patent  Sep. 9, 1986  4,610,105
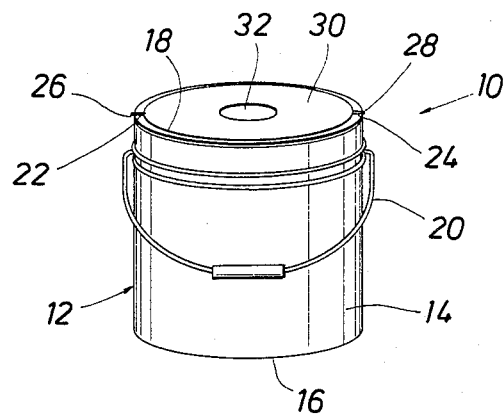
FIG.1
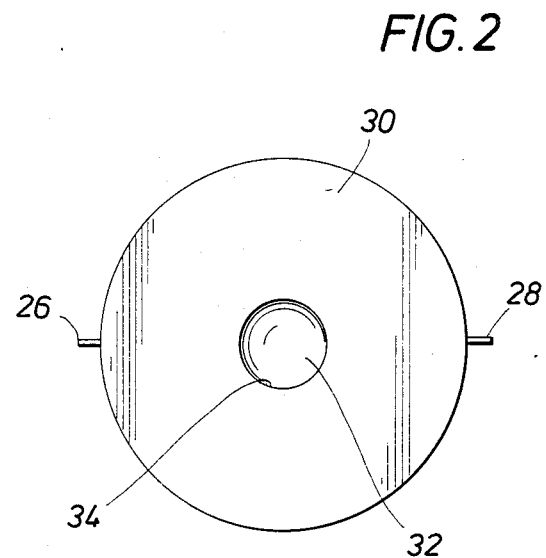
FIG.2
FIG.3
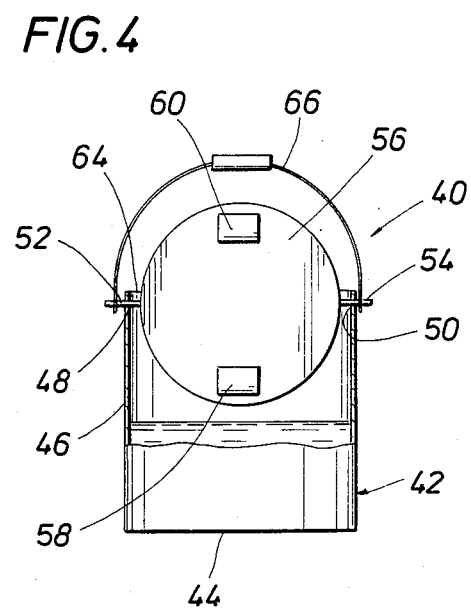
FIG.4
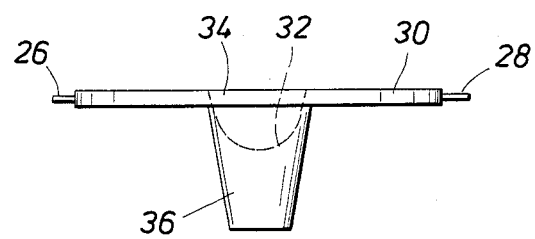
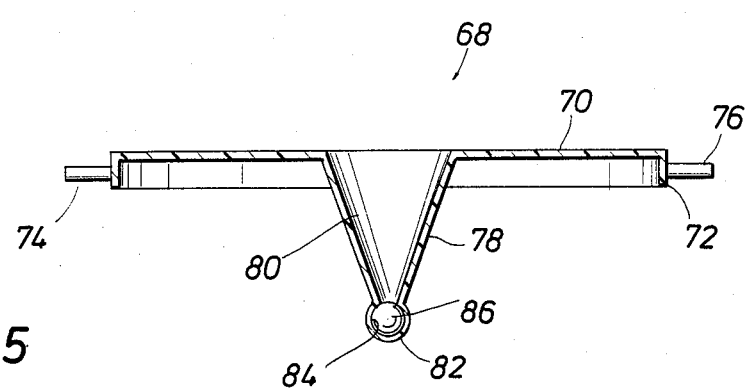
FIG.5

RODENT TRAP

FIELD OF THE INVENTION

This invention relates generally to trapping devices for catching rodents and other such pests and more particularly relates to a trap mechanism enabling the user to catch the rodents alive for subsequent disposal or to eradicate the rodents at the time they are caught.

BACKGROUND OF THE INVENTION

Rodents such as mice, rats, etc. have long been household pests, causing damage to foodstuffs stored in the household, causing damage to the household structure itself and in many cases carrying various diseases that may have adverse effect upon human and other animal life. It is highly desirable therefore, to prevent such rodents from living in and about a household and, if present, to provide a suitable means for eradicating them.

In the commercial environment involving foodstuffs, rodents cause significant and extensive damage to stored grain as well as causing contamination of various food products that are destined for human and animal consumption. It has been determined that rodents are attracted not only to foodstuff but also to any other substances containing a significant quantity of protein. In cases where grain is stored and shipped in paper or fabric sacks, rodents can cause significant damage, severely adversely affecting the financial return of the commercial operation involved. It is highly desirable therefore to prevent rodents from living and multiplying in environments where foodstuffs are stored or transported and, if present to provide effective means for eradicating them without risking contamination of the foodstuffs.

Many different rat traping devices have been developed in the past for catching and eradicating rats and mice. In most cases, these devices are provided with a bait which attracts the rodents to the trap. Upon attempting to eat the bait, or take it away, the trap is triggered, usually causing the trap mechanism to trip and catch the rodent. In most cases, the rodent is eradicated by the trap device. Other methods for disposing of such rodents include the use of various toxic chemical compounds that are intended to be eaten by the rodents and cause them to die. One disadvantage of using toxic rat bait is that the presence of dead rodents in a domestic or commercial environment can constitute a problem from the standpoint of health. Further, the presence of toxic chemical substances in and about domestic and commercial environments can constitute a hazard to household pets and humans and to foodstuffs and other materials present in the commercial environment. Unfortunately rodents are very sensitive to the presence of toxic materials and soon learn to avoid the toxic bait. Other types of devices for generating ultrasonic energy are also used to create undesirable sound that drives away the rodents. These types of devices have seldom proved effective.

SUMMARY OF THE INVENTION

It is therefore a principle object of the present invention to provide a novel rodent trap device that lures rodents to it through the use of grain or any other suitable bait and is actuated by the weight of the rodent, causing the rodent to fall into a suitable enclosure where it will remain until ultimate disposal is accomplished.

It is also a feature of this invention to provide a novel trap for rodents which is capable of catching and retaining several rodents at any given time whereas typical rodent trap devices are capable of catching only one rodent at a time.

It is an even further feature to provide a novel rodent trap device that enables the user to catch and retain the rodents alive for ultimate disposal or to exterminate them at the time they are caught.

Briefly, this invention concerns the provision of an enclosure having bottom and side walls and forming an upwardly directed opening at the upper portion thereof. The enclosure may be imperforate so that it may contain water or any other suitable liquid for extermination of rodents or, it may be preforate so as to maintain the rodents entraped in a live condition until suitable disposal can occur. If desired, the enclosure may also contain food and water for the rodents to maintain them in a live and healthy condition until appropriate disposal can be accomplished. The enclosure may be of any desired configuration and be composed of any suitable material sufficient to contain entrapped rodents and prevent their escape until their disposal can be accomplished. For example, the enclosure may be in form of screen wire or it may conveniently take the form of a large perforate or imperforate bucket or barrel structure within the spirit and scope of the invention.

The upper wall portions of the enclosure define pivot supports within which are received the opposed pivots of a pivotal closure, generally closing the upperwardly directed opening. The closure is delicately balanced by its pivots, thereby causing it to pivot responsive to the weight of a rodent to a position allowing the rodent to fall into the enclosure. The closure also includes a suitable container for grain or any other suitable bait which lures the rodent toward it. The closure is further provided with a counterweight which is so positioned to as to urge return of the closure to a generally horizontal, closed position relative to the opening of the enclosure. The closure therefore is maintained in its closed delicately balanced position by the force of the counterweight until a rodent steps onto the closure. When this occurs the closure will readily pivot to its open position, thereby allowing the rodent to fall into the enclosure and become entrapped. After the rodent has fallen from the closure member into the enclosure, the closure member is quickly returned by its counterweight to the horizontal closed position in readiness for catching another rodent. An antirotation stop member may be incorporated in the assembly of the enclosure and closure to thus prevent the closure member from overrotation.

Other and further objects advantages and features of the present invention will become apparent to one skilled in the art upon consideration of this entire disclosure including the specificationm claims and the annexed drawings. The form of the invention, which will now be described in detail, illustrates the general principles of the invention, but it is to be understood that this detailed description is not to be taken as limiting the scope of the present invention.

BRIEF DESCRIPTION OF THE DRAWINGS

So that the manner in which the above-recited features, advantages and objects of the present invention, as well as others which will become apparent, are attained and can be understood in detail, a more particular description of the invention, briefly summarized above, may be had by reference to the embodiments thereof which are illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

FIG. 1 is an isometric view of a rodent trap constructed in accordance with the present invention.

FIG. 2 is a plan view of the closure member of the rodent trap of FIG. 1.

FIG. 3 is an elevational view of the closure of FIG. 2 illustrating the bait receptacle thereof in broken lines.

FIG. 4 is an elevational view with parts thereof broken away and shown in section, illustrating a rodent trap representing a modified embodiment of the present invention.

FIG. 5 is a sectional view of the closure portion of a rodent trap similar to that of FIG. 1 and representing a further embodiment of this invention.

DETAILED DESCRIPTION OF THE PREFERRED EMBODIMENT

Refering now to the drawings and first to FIG. 1 a rodent trap constructed in accordance with the present invention is illustrated generally at 10 which includes an enclosure 12 having sidewalls 14 and a bottom wall 16. The enclosure 12 defines an upwardly directed opening 18. The enclosure 12 may also be provided with a carrying handle or bail 20 enabling it to be transported in the manner of carrying a bucket. In fact, the enclosure 12 may be defined by a bucket or other container of suitable size and dimension for use in accordance with the present invention.

The enclosure 12 defines opposed pivot retainer members 22 and 24 on opposed sides thereof which are adapted to receive opposed pivot members 26 and 28 respectively of a pivotal closure member 30. The pivot members 26 and 28 establish delicate balancing of the closure member allowing it to readily pivot responsive to the weight of a rodent stepping onto the closure.

For the purpose of attracting rodents to the closure member 30 it is desirable to provide the closure with a suitable bait, so located that the rodent must step onto the closure in order to reach the bait. Accordingly, such is accomplished by providing the closure member 30 with a bait pocket 32 which is adapted to contain a suitable quantity of bait such as grain or any other suitable material containing a substantial quantity of protein. The bait pocket is of such configuration that the bait will not pour from the bait pocket when the closure is tilted to its maximum extent. As shown in FIGS. 2 and 3 the closure member 30 defines a central opening 34 and a counterweight member 36 extends downwardly from the central portion of the closure. The bait pocket 32 is formed cooperatively by the counterweight member 36 and the opening 34 of the closure. The counterweight member 36 may be formed integrally with the closure member 30 such as by molding the same from any suitable plastic material or, in the alternative, it may be connected to the closure member in a suitable manner.

The counterweight member 36 functions, in addition to defining a portion of the bait pocket, to develop a downwardly directed force acting upon the central portion of the closure member 30. This downwardly directed force is arranged so as to normally urge the closure member 30 to the substantially horizontal, closed position shown in FIGS. 1 and 3. The force induced by the counterweight member 36 is of such designed magnitude that it will readily urge the closure member to its horizontal closed position. Even with the small weight of a small rodent on the closure, such as a young mouse for example, it will readily pivot to its open position thereby allowing the rodent to fall into the enclosure. The closure member 30 is therefore delicately urged to its closed position and so balanced that it will readily pivot to its open position when only a few ounces of weight act on the closure member. Of course, the weight of the rodent must be other than in line with the opposed pivot members in order to develop sufficient force that the closure member will open.

Referring now to FIG. 4 a rodent trap is illustrated generally at 40, representing a modified embodiment of the present invention. A closure member 42 is provided defining a bottom wall 44 and side walls 46. In this case, the side wall is typically in the form of a cylindrical structure such as might be defined by a bucket or a conventional barrel but, of course it may take any other configuration without departing from the spirit of the scope of the present invention. Again, the enclosure may be inperforate such as to retain water or any other suitable liquid as shown in FIG. 4 to cause eradication of the rodent as it falls into the enclosure. Alternatively, the enclosure may be preforate so as to allow the entrapped rodent to remain alive until ultimate disposal is accomplished. The upper wall portions of the enclosure 42 defines pivot openings 48 and 50 within which are received pivot members 52 and 54 which provide pivotal support for a closure member 56. The closure 56 is provided on one side with a counterweight member 58 and on the opposite side with a bait container 60. The counterweight and the bait container are of such dimension that the closure 56 will be delicately urged from its open position as shown in FIG. 4 to its generally horizontal closed position so that is may be opened by the weight of a small rodent. In the embodiment shown in FIG. 3, the enclosure defines an upper wall structure 62 forming a circular central opening 64 within which the closure member 56 fits rather closely. It is only necessary that the closure member be completely free to pivot towards its open position on application of a small weight thereto such as would occur when a mouse steps onto the closure. The pivot members 52 and 54 may also define support for a bail or other carrying handle 66.

FIG. 4 is a sectional view of a closure member shown generally at 68 and which represents a modified embodiment of the present invention. The closure member 68 may be utilized as a pivotal closure or a rodent entrapping closure of any suitable character. For example, the enclosure may be defined by a bucket, a wire cage, a barrel or may take any other suitable alternative form. The closure member 68 defines a flat upper wall portion 70 to which is integrally connected a circular side flange 72. Of course it should be born in mind that the closure 68 need not be of circular form, it may be of rectangular form or any other suitable form without departing from the spirit and scope of the present invention. A pair of pivot members 74 and 76 extend from opposed sides of the downwardly extending flange 72 and are exposed in axial registry so that the closure member 70 will readily pivot responsive to the weight of a rodent. Centrally of the upper planar wall 70 of the closure may be integrally formed a depending wall portion 78 defining a bait containing depression 80. Grain or other suitable protein containing substance may be placed in the bait containing depression to thereby lure rodents toward the central portion of the closure. As shown in FIG. 5 the wall structure 70 may be of generally conical form, and may define a lower wall portion 82 forming a weight containing enclosure 84 within which may be disposed a weight member 86. The weight member may suitably take the form of a spherical lead shot as shown in FIG. 4 or, in the alternative it may take any other configuration without departing from the spirit and scope of this invention.

In the embodiments described in detail above, in each case the closure members will readily pivot from a normal horizontally disposed position to an inclined open position responsive to a weight of a rodent thereon. This causes the rodent to fall into an enclosure thus entrapping the rodent for ultimate disposal. The rodent may be trapped alive or may be eradicated upon entrapping as suites the desires of the user. In view of the foregoing, it is apparent that the present invention is clearly adapted to accomplish all of the features hereinabove set forth, together with other features which will become obvious and inherent from the description of the apparatus itself. It will be understood that certain combinations and subcombinations are utility and may be employed without reference to other features and subcombinations. This is contemplated by and is within the scope of the present invention.

What is claimed is:

1. A trap for catching rodents and other pests and permitting the user to selectively trap the same alive or eradicate them, comprising:
   (a) container means having an opening at the upper portion thereof, said container means defining closure support means and forming pivot bushing means;
   (b) closure means of generally plate-like form and defining an upwardly opening depression movably engaging said closure support means and being normally generally horizontally positioned in closing relation with said opening of said container means, said closure means having pivot means establishing pivotal engagement with said pivot bushing means, said closure means being movable to an open position responsive to the weight of said rodent or pest, causing said rodent or pest to fall into said container means;
   (c) said closure means forms depending wall structure forming said upwardly opening depression for containing bait and being positioned to lure said rodent or pest onto said closure means said depending wall structure forming a weight containing receptacle; and
   (d) a weight member being retained within said weight containing receptacle and being operative to urge said closure to the closed position thereof.

2. A trap as recited in claim 1 wherein:
   (a) said depending wall structure is of downwardly converging tapered form;
   (b) said weight member containing receptacle is of generally spherical form and defines a circular restricted opening; and
   (c) said weight member is of spherical form having a dimension slightly exceeding that of said circular restricted opening, the material of said depending wall structure being resilient and yielding to permit forcible entry of said weight into said weight containing receptacle and retaining said weight against inadvertent displacement from said weight containing receptacle.

3. Rodent capturing means for movable assembly with a rodent trap enclosure having bottom and side walls and forming an opening at the upper portion thereof and support means near said opening, said rodent capturing means comprising:
   (a) pivot means for pivotal engagement with said support means;
   (b) closure wall means being connected to said pivot means and being pivotally movable from a generally horizontal closed position extending across said opening to an inclined open position with respect to the horizontal, said closure wall means being pivotally movable to said inclined position responsive to the weight of a rodent thereon, allowing the rodent to fall into said trap enclosure for capture;
   (c) said closure wall means defining depending wall means forming an upwardly opening depression for containing bait for attracting rodents and causing them to step onto said wall means, said depending wall means forming a weight containing receptacle at the lower portion thereof; and
   (d) a weight member being retained within said weight containing receptacle and being operative to urge said closure to said horizontal closed position thereof.

4. Rodent capturing means as recited in claim 3 wherein:
   (a) said depending wall structure is of downwardly converging tapered form;
   (b) said weight containing receptacle is of generally spherical form and defines a circular restricted opening; and
   (c) said weight means is of spherical form having a dimension slightly exceeding that of said circular restricted opening, the material of said depending wall structure being resilient and yielding to permit forcible entry of said weight means into said weight containing receptacle and retaining said weight means against inadvertent displacement from said weight containing receptacle.

5. Rodent capturing means as recited in claim 4 wherein:
   said closure wall means is of generally planar form and defines circumferential flange means depending downwardly therefrom, said pivot means and said closure wall means are of integral construction.

6. Rodent capturing means as recited in claim 5 wherein:
   said weight means is supported by said depending wall means in off-set relation with the axis defined by said pivot means.

7. Rodent capturing means as recited in claim 3 wherein:
   said closure wall means is of generally plate-like form and is substantially horizontally disposed at the closed portion thereof, said bait containing means of said closure means being wall structure extending downward from the central portion of said closure wall means and defining an upwardly directed receptacle for containing bait suitable for attraction of rodents thereto.

8. In a rodent trap having a receptacle forming an upwardly directed opening, the improvement comprising:
  (a) pivot opening means being defined by said receptacle;
  (b) a closure wall member having opposed pivot elements receivable in pivotal relation with said pivot opening means, said closure wall member being normally disposed in generally horizontal position and being pivotal to an inclined position responsive to the weight of a rodent or pest on said closure wall member; and
  (c) a weight member formed integrally with said closure wall member and depending from the central portion of said closure wall member, said weight member urging said closure wall member to said substantially horizontal position, at the juncture of said weight member with said closure wall member said weight member and said closure wall member defining an upwardly diverging bait depression centrally of said closure wall member for containing bait to attract rodents or pests to said closure wall member.

* * * * *